(12) United States Patent
Acker

(10) Patent No.: US 9,201,086 B2
(45) Date of Patent: Dec. 1, 2015

(54) SPEED SENSOR COMPRISING A COSTAS LOOP

(75) Inventor: Heinrich Acker, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 167 days.

(21) Appl. No.: 13/699,856

(22) PCT Filed: Jun. 10, 2011

(86) PCT No.: PCT/EP2011/059709
§ 371 (c)(1),
(2), (4) Date: Nov. 26, 2012

(87) PCT Pub. No.: WO2011/154531
PCT Pub. Date: Dec. 15, 2011

(65) Prior Publication Data
US 2013/0069634 A1    Mar. 21, 2013

(30) Foreign Application Priority Data

Jun. 10, 2010 (DE) .......................... 10 2010 029 961

(51) Int. Cl.
*G01P 3/48* (2006.01)
*G01P 3/54* (2006.01)
*G01P 3/489* (2006.01)
*G01D 5/244* (2006.01)
*G01P 3/00* (2006.01)

(52) U.S. Cl.
CPC ............ *G01P 3/489* (2013.01); *G01D 5/24404* (2013.01); *G01P 3/00* (2013.01)

(58) Field of Classification Search
CPC ........... G01P 3/489; G01P 3/48; G01P 3/481;
G01P 13/04; G01P 13/045; G01P 3/00;
G06F 17/14; G06F 17/142; H04B 10/272;
H04B 1/7075; H04B 2001/70706; G01D 5/24404
USPC ......... 324/160, 161, 163, 166, 176, 177, 178, 324/173, 174, 207.5; 327/156
See application file for complete search history.

(56) References Cited

U.S. PATENT DOCUMENTS

| 4,031,466 | A | 6/1977 | Krause et al. |
| 4,602,515 | A * | 7/1986 | Eichenlaub ............... 73/862.328 |
| 6,154,487 | A * | 11/2000 | Murai et al. .................. 375/150 |
| 6,577,229 | B1 * | 6/2003 | Bonneau et al. ........... 340/10.41 |
| 6,646,964 | B1 | 11/2003 | Abramovitch et al. |
| 6,741,650 | B1 * | 5/2004 | Painchaud et al. ........ 375/240.21 |
| 7,062,403 | B2 * | 6/2006 | Betz et al. ..................... 702/145 |

(Continued)

FOREIGN PATENT DOCUMENTS

| EP | 1 598 672 | 11/2005 |
| EP | 1598672 A2 * | 11/2005 |
| WO | WO 00/63897 | 10/2000 |

OTHER PUBLICATIONS

International Search Report corresponding to International Application No. PCT/EP2011/059709, dated Sep. 21, 2011.

(Continued)

*Primary Examiner* — Jay Patidar
*Assistant Examiner* — Raul Rios Russo
(74) *Attorney, Agent, or Firm* — RatnerPrestia

(57) ABSTRACT

A speed sensor including at least one sensor element and an analog-to-digital converter that digitizes the output signals of the at least one sensor element, and a Costas loop unit that is connected to the output of the analog-to-digital converter.

10 Claims, 3 Drawing Sheets

(56) References Cited

U.S. PATENT DOCUMENTS

| | | | |
|---|---|---|---|
| 7,528,755 B2* | 5/2009 | Hammerschmidt | 341/143 |
| 7,751,503 B2* | 7/2010 | Lawrow et al. | 375/326 |
| 7,826,582 B2* | 11/2010 | Kuhns et al. | 375/375 |
| 8,330,451 B2* | 12/2012 | Schunk et al. | 324/166 |
| 2003/0009283 A1* | 1/2003 | Pratt | 701/213 |
| 2005/0179429 A1* | 8/2005 | Lohberg | 324/207.13 |
| 2006/0022868 A1 | 2/2006 | Awata | |
| 2006/0047507 A1* | 3/2006 | Van der Burgt et al. | 704/226 |
| 2006/0170470 A1* | 8/2006 | Wang | 327/158 |
| 2006/0250170 A1* | 11/2006 | Wang | 327/156 |
| 2011/0117903 A1 | 5/2011 | Bradley | |
| 2013/0073250 A1* | 3/2013 | Acker | 702/142 |

OTHER PUBLICATIONS

German Search Report corresponding to Application No. DE 10 2011 077 399.1, dated Nov. 24, 2011.

* cited by examiner

SPEED SENSOR COMPRISING A COSTAS LOOP

CROSS REFERENCE TO RELATED APPLICATIONS

This application the is the U.S. National Phase Application of PCT International Application No. PCT/EP2011/059709, filed Jun. 10, 2011, which claims priority to German Patent Application No. 10 2010 029 961.8, filed Jun. 10, 2010, the contents of such applications being incorporated by reference herein.

FIELD OF THE INVENTION

The invention relates to a speed sensor comprising at least one sensor element and an analog-to-digital converter, which digitizes the sensor-element output signals, and the use of said sensor in motor vehicles.

BACKGROUND OF THE INVENTION

Measuring a rotational speed, which is required in the art on many machines and systems, is physically equivalent to measuring the angular speed. It is generally known to measure the rotational speed of shafts by applying a periodic pattern known as an "encoder" (e.g. a gear) around the circumference of the shaft, which is sensed by a sensor mounted in a fixed position beside the shaft. The sensor is capable of distinguishing between tooth and tooth gap (or other periodically varying properties, such as e.g. magnetic field direction or optical transparency). The sensor then generates an output signal which has the same periodicity as the sensed pattern.

A sensor of this type outputs different signals depending on the signal processing that is present: there are approximately sinusoidal signals, which are usually generated directly from the primary sensor element, or square-wave signals, which are usually generated by comparators by the downstream signal processing. The sinusoidal signals often occur as a sine/cosine signal pair, because this combination has advantages, including with regard to detecting the direction. Any combinations of said signals are possible, so that up to four outputs (and any subset thereof) may exist: sine, cosine, square-wave in phase with sine, square-wave in phase with cosine. All of these signals are analog frequency signals, i.e. the frequency varies continuously within the interval defined by the application. The electrical output signal is a direct image of the encoder. Thus even the square-wave signals cannot be considered to be "digital", because the discrete amplitude variable does not contain discretized information from the sensor. Depending on the implementation, there is also the possibility that the physical sensor-based process generates a signal at twice the frequency of the encoder pattern. This is the case, for instance, for certain AMR sensor elements, which have an electrical signal period that encompasses only a 180° rotation of the (encoder) magnetic field.

If sensors of the type described are used in measuring devices or control systems, then it must be taken into account that the described output signals in no way complete the measurement process: whereas most measurement systems provide output signals that are either digitally encoded or have an output value that is a direct measure of the measurand, for the sensors considered here, the measured value must first be calculated from the output waveform or pulse sequence. This applies to speed, angular-speed and rotational-speed measurements and also to angle measurements, because often absolute measurements are needed, which are obtained from the periodic signal by counting. The sine/cosine signals here have the advantage of the possibility of interpolation, but do involve a higher degree of analysis effort.

The technology presented here is used in the same way for linear position and speed measurement, but using linear rather than annular encoders.

The delay in the frequency measurement, which results from the fact that the resolution of the frequency measurement is linked to the counter value, causes problems for control processes. For high-resolution measurements, a large number of pulses must be counted. Since counting the frequency only provides the average value of the frequency in the measurement interval, the bandwidth of the measurement is also limited.

In particular when using square-wave signals, which are very common in some applications, e.g. in the automobile, the accuracy is limited by noise. Unlike sinusoidal signals, for which at least some of the noise lies far outside the frequency band of the sinusoidal waveform and hence can be filtered, square-wave signals provide no opportunity for spectral separation of the components. The noise manifests itself as "jitter", which is the random fluctuation in the position of the pulse edges in the time domain caused by phase noise. A stable square-wave signal requires a very high signal-to-noise ratio in the primary signal of the sensor element. A reduction in this ratio may produce errors in the form of additional, noise-induced pulses, even if the power of the signal is considerably greater than that of the noise.

SUMMARY OF THE INVENTION

Therefore an aspect of the invention proposes a speed sensor that enables a relatively high precision of the frequency measurement and/or angle measurement.

This aspect is achieved according to the invention by a speed sensor comprising at least one sensor element and an analog-to-digital converter, which digitizes the sensor-element output signals, wherein the speed sensor comprises a Costas loop unit, which is connected to the output of the analog-to-digital converter.

In particular, this speed sensor also reduces the noise sensitivity, so that signals having a greater noise component can be used without errors occurring. This improvement shall not be bought at the expense of bandwidth or an increase in the delay.

A Costas loop unit is preferably understood to mean an electronic apparatus that comprises a Costas loop for signal processing.

The analog-to-digital converter is preferably in the form of a sigma-delta modulator.

The Costas loop unit is preferably designed so that it provides at least a frequency output signal or a phase output signal or a frequency output signal and a phase output signal, each on the basis of the sensor-element output signal.

It is preferred that the output of the analog-to-digital converter, which provides a bit stream, is connected in each case to a first multiplier and to a second multiplier, wherein additionally the first multiplier and the second multiplier are each fed with a clock signal from a clock generator unit, wherein the clock signals fed to the first multiplier and the second multiplier are offset in phase by 90° with respect to one another, wherein the output signal from the first multiplier and the second multiplier is fed in each case to a low-pass filter, the outputs of which are each fed to a common phase detector unit, which is connected on the output side to a controller unit, the output of which is connected to the clock generator unit. In particular, the Costas loop unit comprises or forms the above preferred circuit.

The clock generator unit is preferably in the form of a numerically controlled oscillator also known as an "NCO", "digitally controlled oscillator" or "DCO", wherein said clock generator unit provides the frequency output signal and/or the phase output signal as output signals from the Costas loop unit.

It is preferred that the output signal from the phase detector unit and the phase output signal from the clock generator unit are summated, in particular in a summator, thereby generating a corrected phase signal that forms an output signal from the Costas loop unit, in particular alternatively or additionally to the phase output signal from the clock generator unit. This summation or summator is understood to mean in particular likewise a subtraction or a respective subtraction circuit. This summation and hence the formation of the corrected phase signal take place particularly preferably in a correction device of the speed sensor.

The speed sensor preferably comprises an output circuit to which are fed from the Costas loop unit a frequency signal and at least one phase signal, in particular the frequency output signal from the clock generator unit and the phase output signal from the clock generator unit and/or the corrected phase signal, wherein the output circuit comprises at least one driver stage for transmitting the output signal from the speed sensor over at least one line, and comprises a logic unit, which is used to provide the output signal from the output circuit such that it has defined signal properties as a defined interface.

It is preferred that the logic unit is designed to be programmable and/or switchable, so that the output signal from the output circuit and hence from the speed sensor is designed to be adaptable to different interface requirements. In this case, the logic unit comprises in particular a simple connecting line between a flip-flop of a phase register and the output, wherein the driver stage switches whenever the state of this flip-flop changes, i.e. the phase exceeds a certain threshold value. In the preferably alternative switchable design or additional switchable design of the logic unit, the logic unit generates a data word in which at least one piece of frequency information and/or phase information is encoded.

At least the Costas loop unit and the output circuit are preferably in the form of digital circuits.

It is advantageous that the logic unit comprises a compensation device, which contains, in particular in at least one table, compensation data, which can be used to compensate for encoder errors, the modulated magnetic field or optical pattern of which the sensor element detects, and/or can be used to compensate for temperature effects and/or can be used to adjust or program a phase offset and/or can be used to compensate for a delay in the signal path within the sensor, for which purpose the compensation device is controlled from outside the speed sensor and/or is controlled internally, autonomously by the speed sensor.

In particular, the speed sensor according to the invention is based on the idea of making a paradigm shift in the way the frequency or the angle is determined. A circuit for shaping pulses from the primary sinusoidal signal (input signal), as is known in the prior art, is replaced by a phase control system. An oscillator in the measuring circuit is controlled to the same frequency and phase as the input signal. The system is preferably implemented entirely digitally, including the oscillator. This means that the oscillator is what is known as a numerically controlled oscillator or NCO, also referred to as a phase accumulator. These oscillators have, for example, digital registers, in which the instantaneous values of frequency and phase are held, so that this information is available directly as binary values for further processing. The phase control system is implemented here as a Costas loop in a Costas loop unit. This phase locked loop has better lock-in and lower phase noise than conventional phase locked loops.

Since every control system contains a control error, it must be assumed that there is an unwanted phase offset between input signal and NCO, which varies over time. This property of every phase control system might be relevant to the present application, because the phase, which here is equivalent to an angle, is one of the two measured values. Depending on the application, this may even be the measured value that is of main interest. Thus it is advantageously proposed to add to the Costas loop unit a device for improving determination of the phase, or in other words a correction device. This correction device requires the use of an in particular linear phase detector. A detector of this type outputs a signal that is proportional (within the limits of the word length of the digital implementation) to the phase difference, unlike the phase detectors in widespread use, which merely provide a piece of binary information as to whether one of the input signals is leading or lagging.

The correction device preferably consists in summation of the phase difference supplied by the phase detector unit with the phase of the clock generator unit in order to correct the current phase error (=phase difference).

The input signal to the Costas loop unit is preferably generated by a sigma-delta modulator, which connects the sensor element and the Costas loop. It generates from the electrical variable from the sensor element a bit stream with which the Costas loop works.

The exemplary embodiment includes a preferred description of the control process and of the elements of the Costas loop.

The preferred solution effectively involves narrow-band filtering of the signal from the sensor element, wherein the center frequency of the filter is constantly adjusted to the frequency of the sensor element. Noise is thereby effectively blanked out, achieving the objective of being able to measure frequency and phase using very noisy sensor signals. The precision is improved because noise that causes jitter is suppressed. The bandwidth of the frequency measurement can be defined by the selection of the low-pass cutoff frequencies of the low-pass filters in the feedback paths of the Costas loop unit. The digital implementation here enables dynamic adaptation of the filter characteristics to the requirements. Cutoff frequency, filter order, coefficients: all the parameters can be adapted to suit the application and current input frequency. The same is true for the controller unit, which can be designed as a simple PID controller, but need not necessarily be in this form. In particular, the controller can have a plurality of operating modes, which take over dynamically depending on the input signal. Relevant reasons or conditions for the change in operating mode or between operating modes include:

1. Immediately after system switch-on or after losing lock-in, a search mode, which increases the rate of change of the NCO frequency at the expense of phase stability.
2. Certain frequency ranges may be associated with different maximum rates of change of the frequency.
3. The amplitude of the input frequency can be measured, and the rate of change of the frequency can be limited e.g. for small amplitudes to avoid losing lock-in.

Depending on the application, it is advantageous to provide an error flag, which signals to a higher-level control system, for example an electronic control unit ECU, that lock-in has been lost or there is an insufficient input signal.

The completely different signal-processing implementation compared with conventional rotational-speed or angular-speed sensors known until now enables new exemplary, preferred functions, which are either not possible in the conventional system design or can only be realized with great difficulty:

1. The output signal of the speed sensor can be programmed as required by means of the output circuit. If it is assumed that a pulse sequence at the output is meant to encode the phase, then the pulse output can change its value for certain values of the phase register in the NCO. Thanks to the implementation, these values can be programmed as required, which means that the number of pulses is no longer tied to the number of periods of the encoder. It is possible that an encoder having e.g. 41 teeth around the circumference generates e.g. 113 pulses per revolution. The number of pulses per revolution need not even be a whole number, if this is what the user wants.
2. The user-programmability also applies to a phase offset at the output. Thus the new sensor is particularly suited to mimicking existing sensors that have a different transfer function, and finding use as a replacement part or alternative product in appropriate systems.
3. It follows from 1. and 2. that the new sensor is ideally suited to being integrated in existing systems in which the encoder is replaced by an encoder that has better instrumentation properties but where changes to the electronics on the receiver side are not permitted.
4. Until now, specifying a number of pulses per revolution in association with an encoder radius likewise meant fixing a period length to the encoder circumference. Hence in practice very large differences arise in the period length, depending on the application. A universally usable sensor, which is meant to benefit from the economies of scale of producing in large quantities, must support all these period lengths. Specifying a fixed period length, however, has instrumentational advantages for the sensor element. These can be exploited for the first time using the new sensor, because the preferred period length can be selected for an encoder radius specified by the user and for the number of pulses per revolution. A number of periods per revolution is obtained therefrom that is converted into the required number of pulses by suitable programming of the sensor.
5. Compensation of the time delay: every sensor system has a time delay between a stimulus of the measured value and the associated response at the output. If the time delay is not proportional to the period length of the frequency to be measured, this means for an angular-speed sensor that there is a frequency-dependent phase offset in the output signal. Since the new sensor as a digital system is not affected by parameter tolerances or parameter drift, this relationship can be determined at the design stage, or even, if applicable, later by tests, in which case also using the analog part at the input (sensor element, modulator). Compensation can easily be achieved by designing a frequency-dependent shift in the switching of the output precisely so that no phase offset occurs. It should be pointed out in conjunction with 2. that the shift may not only be made in the direction of a delay but also in the direction of an advance. The apparent propagation delay through the sensor can thus be set to zero (of course this does not remove the causality: setting to zero occurs precisely only in the stationary state, i.e. at a constant frequency).
6. Compensation of encoder errors: ideal encoders are exactly periodic, real encoders only approximately. The differences in the length of the individual "periods" result in apparent recurring changes in the frequency. Now in many applications there are operating states that feature a high degree of constant speed e.g. when a drive has been switched off. A constant deceleration, in which no short-term variations occur, then only arises as a result of friction. If the sensor can be notified of such an operating state, then the individual period lengths can be saved in a table, which can be used later in operating modes containing short-term variations in order to compensate for encoder errors.

In addition, the invention also relates to the use of the speed sensor in motor vehicles, in particular as a crankshaft speed sensor or wheel speed sensor or as a rotational speed sensor in powertrain components, for example in this case as a gear speed sensor, or turbocharger speed sensor, or alternatively preferably in linear, incremental sensors.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

List of References

Figure 1:
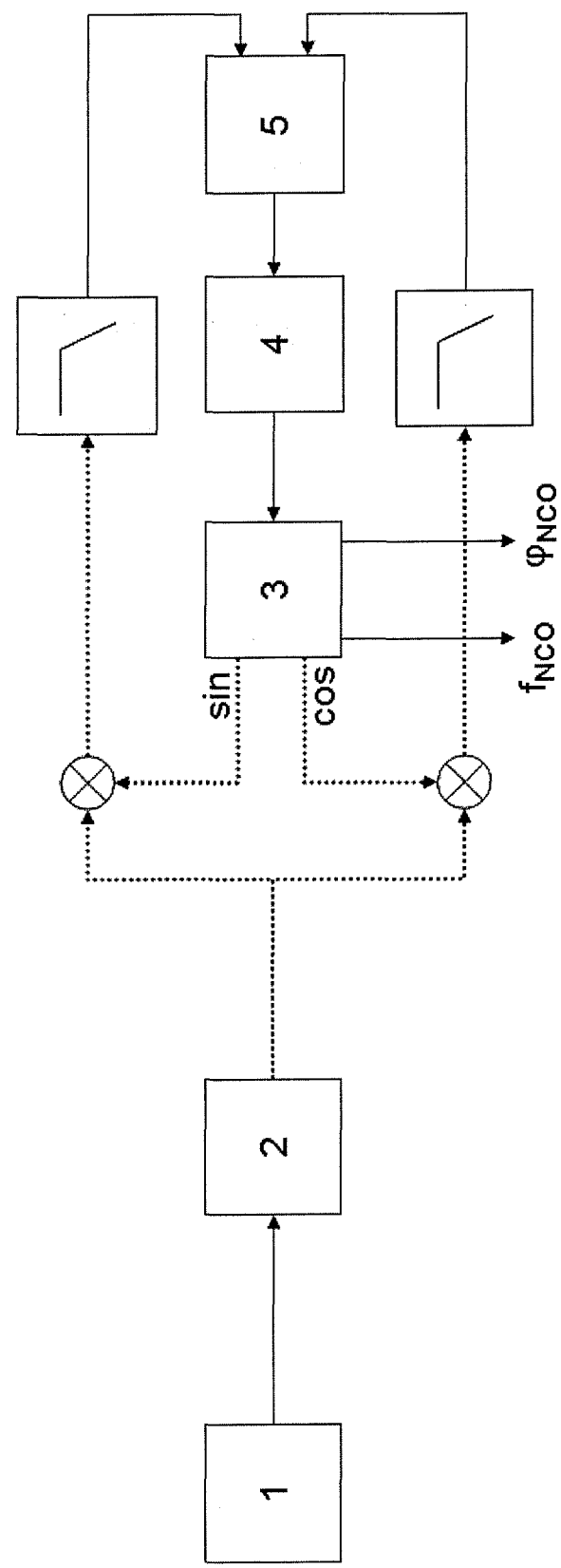
FIG. 1 illustrates an exemplary circuit for frequency measurement and phase measurement by means of the Costas loop device or Costas loop and sensor element.
Figure 2:
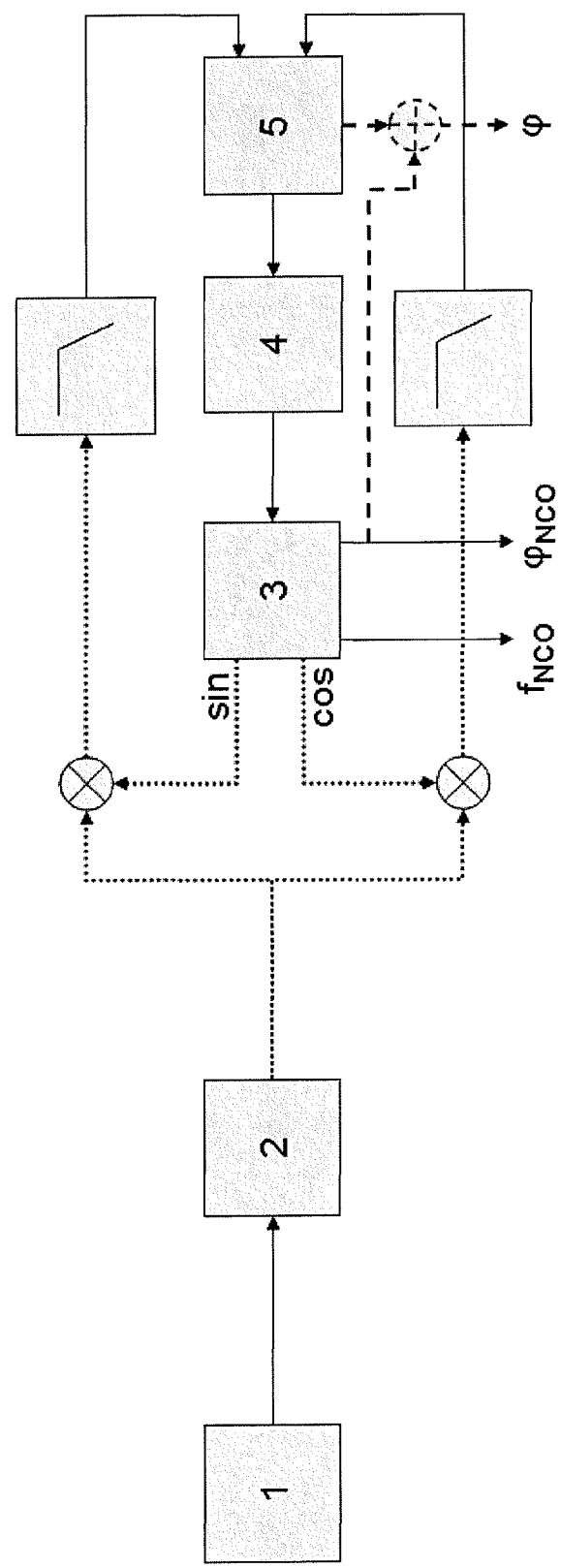
FIG. 2 illustrates an exemplary solution comprising a correction device for improving the phase measurement or for generating a corrected phase signal.
Figure 3:
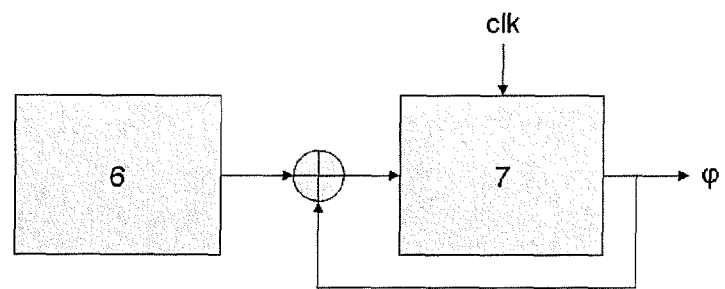
FIG. 3 illustrates an exemplary design of an exemplary clock generator unit as an NCO.
Figure 4:
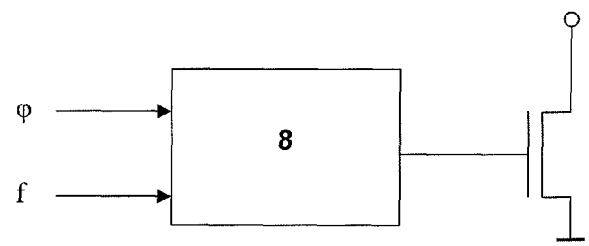
FIG. 4 illustrates an exemplary output circuit for generating the usual output pulses.

1 sensor element: the physical transducer element. Converts the variable that is modulated by the encoder into an electrical variable
2 analog-to-digital converter, in the form of a sigma-delta modulator by way of example
3 clock generator unit, in the form of a numerically controlled oscillator "NCO" by way of example, shown having two outputs "sin" and "cos" having a mutual phase offset of 90°.
4 controller unit or controller: defines by its transfer function the "translation" of phase difference into the change in the NCO frequency
5 phase detector unit or phase detector
6 frequency register
7 phase register
8 logic unit or logic block in the output circuit for pulse generation as the output signal from the speed sensor An exemplary embodiment of the speed sensor is illustrated schematically by FIGS. 1 to 4. FIG. 1 shows the circuit for frequency measurement and phase measurement by means of the Costas loop device or Costas loop and sensor element; FIG. 2 shows the solution comprising a correction device for improving the phase measurement or for generating a corrected phase signal. FIG. 3 shows the design of an exemplary clock generator unit as an NCO. FIG. 4 shows the output circuit for generating the usual output pulses.

In FIG. 1, the signal flow starts at the sensor element 1. The output signal, usually a voltage, is routed to the sigma-delta modulator 2. The modulator generates a bit sequence ("bit stream") therefrom that contains a density of ones that is proportional to the sensor signal. The bit streams are represented by the dotted lines for clarity. The output signal from the modulator is applied to the inputs of two multipliers (represented by the standard circuit symbol), and the other input of each multipler, as the clock generator unit, is connected to an output of the NCO 3. The NCO outputs are labeled with "sin" and "cos" to illustrate the 90° phase offset between the outputs. Since bit streams are involved, the multipliers are merely single XOR gates. They generate two further bit streams, which contain as frequencies the sum and difference of the input frequencies, i.e. the frequency of the sensor element and the frequency of the NCO 3. The two downstream low-pass filters, represented by the standard symbols, filter out just the difference from the frequency mix. Low-frequency signals are thereby produced from the (high-frequency) bit streams but which have a word length of significantly greater than 1 bit, e.g. 10 bits. The phase offset of the NCO outputs means that the output signals from the low-pass filters also have a mutual phase offset of 90°. Thus an angle can be determined from these signals. This is the task of the phase detector unit 5. The output signal from this unit corresponds to the phase difference between input and NCO. For this purpose, the phase detector unit uses by way of example for the calculation the four-quadrant arc tangent on its inputs. Using the four-quadrant arc tangent has the advantage of doubling the region of uniqueness from the usual interval $[-\pi/2, \pi/2]$ to $[-\pi, \pi]$. The phase difference is converted in the controller unit 4 using a suitable transfer function and, if applicable, a suitable control strategy, into a signal that controls the frequency of the NCO 3. This closes the control loop.

The outputs of the circuit are the frequency $f_{NCO}$ and the phase $\phi_{NCO}$ of the NCO. These values are available directly in the NCO registers.

FIG. 2 shows the exemplary addition to the Costas loop unit or Costas loop. The addition, shown dashed, is the part that differs from FIG. 1. The phase is taken from the output $\phi_{NCO}$ of the NCO 3 and fed to a summator or summation unit, at the other input of which lies the phase difference from the phase detector unit 5. The sum or the difference, depending on which sign is used in the control system of the particular implementation, is then the corrected phase or corrected phase signal. Short-term control errors have less effect on the phase measurement in this form, because the delay through the control process is removed. This reduces the requirements placed on the control quality of the entire system.

FIG. 3 shows the elements of the NCO 3 as the clock generator unit. The phase register 7 contains the current phase of the NCO. In each step, triggered by the clock signal clk, which has a constant frequency, the contents of the phase register are updated by being summated with the value from the frequency register 6. Hence the rate at which the phase changes becomes proportional to the contents of the frequency register. Controller unit 4 affects this frequency register by setting a new frequency value according to the phase difference. The outputs "sin" and "cos" are derived from the phase $\phi$ by simply switching over the value of the output for specific values of the phase that equal the even and odd multiples of 90°. A single flip-flop and a gate are sufficient to derive each of the outputs, provided the phase is scaled so that there is a binary digit in the phase register that is equivalent to 90°.

Unlike analog implementations of phase locked loops, which are based on VCOs, an NCO can only ever work with discrete frequency values and phase values fixed by the design. This does not mean that there is any restriction on its use in practice, because the resolution can be increased to practically any level. For each additional bit, it is merely necessary to widen the registers and summators accordingly, which only requires a few additional gates.

FIG. 4 illustrates the output circuit. This is essentially a logic unit 8 or a logic block having frequency and phase as inputs and an output which operates a switching transistor 9 as the driver stage for generating the output pulses. An open-drain output is shown by way of example, although in addition to an open collector, a push-pull stage in MOS or bipolar technology is also possible, and likewise any other circuit that can generate two output levels by electronic means.

The contents of the logic unit or logic block depend on the functions that are meant to be possible using the sensor. In the simplest case, the block can be composed of a simple connecting line between a flip-flop of the phase register and the output. Then the transistor switches whenever the state of this flip-flop changes, i.e. whenever the phase exceeds a certain threshold value. Functions such as the abovementioned programmability, compensation for delay time and compensation of encoder errors require logic circuitry, however, in which the threshold value can be shifted on the basis of additional information.

The invention claimed is:

1. A speed sensor comprising:
   at least one sensor element;
   an analog-to-digital converter (ADC), which digitizes an output signal of the at least one sensor element to produce a digitized signal; and
   a Costas loop unit, which is connected to an output of the ADC, the Costas loop unit including:
   a numerically controlled oscillator (NCO) generating a clock signal,
   two multipliers multiplying the clock signal with the digitized signal,
   a phase detector computing a difference signal indicating a phase difference between signals output from the two multipliers,
   a controller configured to synchronize the clock signal with the digitized signal based on the difference signal, and
   a summation unit that produces a corrected phase signal based on a sum or a difference between a) a phase of the clock signal output by the NCO and b) the difference signal output by the phase detector.

2. The speed sensor as claimed in claim 1, wherein the analog-to-digital converter is in the form of a sigma-delta modulator.

3. The speed sensor as claimed in claim 1, wherein the Costas loop unit is designed so that it provides at least a frequency output signal ($f_{NCO}$) or a phase output signal ($\phi_{NCO}$) or a frequency output signal ($f_{NCO}$) and a phase output signal ($\phi_{NCO}$), each on the basis of the sensor-element output signal.

4. The speed sensor as claimed in claim 1, wherein the output of the analog-to-digital converter, which provides a bit stream, is connected in each case to the two multipliers, wherein additionally the two multipliers are each fed with a clock signal from a clock generator unit, wherein the clock signals (sin, cos) fed to the two multipliers are offset in phase by 90° with respect to one another, wherein the output signal from the two multipliers is fed in each case to a low-pass filter, the outputs of which are each fed to a common phase detector unit, which is connected on the output side to the controller unit, the output of which is connected to the NCO.

5. The speed sensor as claimed in claim 4, wherein said NCO provides at least one of the frequency output signal ($f_{NCO}$) and the phase output signal ($\phi_{NCO}$) as output signals from the Costas loop unit.

6. The speed sensor as claimed in claim 1, wherein the speed sensor comprises an output circuit to which are fed from the Costas loop unit a frequency signal and at least one phase signal, wherein the output circuit comprises at least one driver stage for transmitting the output signal from the speed sensor over at least one line, and comprises a logic unit, which is used to provide the output signal from the output circuit such that it has defined signal properties as a defined interface.

7. The speed sensor as claimed in claim 6, wherein the frequency signal is the frequency output signal ($f_{NCO}$) from the NCO and the phase signal is at least one of the phase output signal ($\phi_{NCO}$) from the NCO and the corrected phase signal ($\phi$).

8. The speed sensor as claimed in claim 6, wherein the logic unit is designed to be programmable and/or switchable, so that the output signal from the output circuit and hence from the speed sensor is designed to be adaptable to different interface requirements.

9. The speed sensor as claimed in claim 6, wherein the logic unit comprises a compensation device, which contains, in at least one table, compensation data, which can be used to compensate for encoder errors, the modulated magnetic field or optical pattern of which the sensor element detects, and/or can be used to compensate for temperature effects and/or can be used to adjust or program a phase offset and/or can be used to compensate for a delay in the signal path within the sensor, for which purpose the compensation device is controlled from outside the speed sensor and/or is controlled internally, autonomously by the speed sensor.

10. The use of the speed sensor as claimed in claim 1 for use in motor vehicles, as at least one of a crankshaft speed sensor, a wheel speed sensor, a gear speed sensor and a turbocharger speed sensor.

* * * * *